United States Patent
Salvaggio

[19]
[11] Patent Number: 5,661,263
[45] Date of Patent: Aug. 26, 1997

[54] SURFACE RACEWAY AND METHOD

[75] Inventor: Ronald J. Salvaggio, Orlando, Fla.

[73] Assignee: Phaeton, LLC, Winter Park, Fla.

[21] Appl. No.: 438,520

[22] Filed: May 10, 1995

[51] Int. Cl.[6] .................................................. H02G 3/04
[52] U.S. Cl. ................... 174/48; 174/57; 174/69; 138/114
[58] Field of Search ............... 174/48, 49, 68.1, 174/68.3, 69, 57; 138/114, 111

[56] References Cited

U.S. PATENT DOCUMENTS

| | | | |
|---|---|---|---|
| Re. 32,820 | 1/1989 | Pollack | 174/68.3 |
| 630,599 | 8/1899 | Douglas et al. | |
| 688,970 | 12/1901 | Saylor. | |
| 2,408,253 | 9/1946 | Diebold | 174/36 |
| 3,249,679 | 5/1966 | Bogese | 174/5 |
| 3,383,456 | 5/1968 | Kosak | 174/68.1 |
| 3,907,334 | 9/1975 | Schera, Jr. | 285/20 |
| 4,013,873 | 3/1977 | Olson | 174/68.3 X |
| 4,323,724 | 4/1982 | Shine | 174/48 |
| 4,440,195 | 4/1984 | Van Dongeren | 138/114 X |
| 4,454,374 | 6/1984 | Pollack | 174/68 |
| 4,530,865 | 7/1985 | Sprenger | 428/36 |
| 4,563,542 | 1/1986 | Pollack | 174/68 |
| 4,590,652 | 5/1986 | Harwood | 138/114 X |
| 4,645,158 | 2/1987 | Manning | 248/343 |
| 4,858,591 | 8/1989 | Fu | 126/299 D |
| 4,970,351 | 11/1990 | Kirlin | 174/68.3 |
| 5,041,002 | 8/1991 | Byrne | 439/215 |
| 5,215,280 | 6/1993 | Tigrett | 248/68.1 |
| 5,248,850 | 9/1993 | Laney | 174/65 R |
| 5,304,736 | 4/1994 | Halfacre | 174/48 |
| 5,514,834 | 5/1996 | Zimmerman | 174/48 |

FOREIGN PATENT DOCUMENTS

| | | |
|---|---|---|
| 950028 | 7/1947 | France. |
| 1368536 | 9/1963 | France. |

*Primary Examiner*—Kristine L. Kincaid
*Assistant Examiner*—Dean A. Reichard
*Attorney, Agent, or Firm*—Edward M. Livingston, Esq.

[57] ABSTRACT

A telescopic assembly (1) has a first resilient tube (2) and a second resilient tube (3) that have end-to-end openings between opening edges (4, 5, 7, 8) at circumferential overlaps (6, 9) or alternatively at gaps (24, 25). The resilient tubes can be cylindrical (22, 23), rectangular (26, 27) triangular (28, 29) or otherwise polygonal. The end-to-end openings provide design snugness of telescopic fit for telescopic length adjustment without the need for precise measurement or cutting. The telescopic assemblies are aftermarket-attached with a wall screw (32) or surface covering (42) to surfaces (31, 34, 41) of desired structures and adjusted telescopically for distances between an electrical item, such as a fan (37), and a controller such as a control switch or electrical outlet (36). Cord (38) such as an electrical line or mechanical actuators are inserted in the telescopic assemblies and in any tube elbow (35) or other joint en route from the control switch to the electrical item. A method is to adjust lengths of telescopic assemblies between a control source and an electrical item, insert the cord, and attach the telescopic assemblies to intervening surfaces of the desired structure.

23 Claims, 6 Drawing Sheets

SURFACE RACEWAY AND METHOD

BACKGROUND OF THE INVENTION

This invention relates to surface raceways covering of aftermarket power cords, lines, cables, chains for lights, fans, security devices, computers and various electrical products.

Since early days of electricity, means and methods for covering aftermarket electrical cords and lines have been devised and modified continuously. Today, many types of surface raceways, as defined by Article 352 of the National Electric Code (1993), are used to cover almost any cord, line or cable whether it be non-electrical, electrical, fiber optic, hydraulic activator or other type. None, however, have provided the convenience, simplicity, adaptability, aesthetics, economics and reliability taught by this invention.

Examples of different types of aftermarket cord covering include the following: U.S. Pat. No. 630,599; issued to Douglas et al on Aug. 8, 1899, taught a spiral-overlap flexible covering for electrical cables and wires. U.S. Pat. No. 688,970 issued to Saylor on Dec. 17, 1901, taught a mesh asbestos fire protector for telephone cables. U.S. Pat. No. 2,408,253, issued to Diebold on Sep. 24, 1946, taught a C-shaped tube with a linear gap that was tensioned circumferentially on cord as a protective cover. French Patent No. 950,028, issued to Bernard et al on Jul. 23, 1947, taught a C-clamp spring-positioned on a plurality of electrical liner juxtaposed in a compartmental bracket. French Patent No. 1,368,536, issued to Raymond on Sep. 6, 1963, described a C-clamp that was screw-positioned on a plurality of electrical lines juxtaposed in a compartmental bracket. U.S. Pat. No. 3,249,679, issued to Bogese on May 3, 1966, described an opposite-directional spiral-expansive cover for protecting electrical joints and lines extended in opposite directions from the electrical joints. U.S. Pat. No. 4,454,374, issued to Pollack on Jun. 12, 1984, taught arcuate tubing with an attachment plate in a C-shaped configuration for covering electrical cord. U.S. Pat. No. 4,530,865, issued to Sprenger on Jul. 23, 1985, taught an arcuate cord-cover, tube with either a D-leg or an L-leg base for attachment to a surface. U.S. Pat. No. 5,215,280, Issued to Tigrett on Jun. 1, 1993, taught a C-tube covering with screw-on orifices and wrench-access orifices for attachment to marine-grade shore power structures. U.S. Pat. No. 4,563,542, issued to Pollack on Jan. 7, 1986, taught an adaptation of his 1984 patent with a dome-shaped configuration for aesthetic features. U.S. Pat. No. 4,970,351, Issued to Kirlin on Nov. 13, 1990, taught an automobile wiring harness conduit having a corrugated tubular wall threadable into a sound-deadening split tube. Finally, U.S. Pat. No. 5,304,736, issued to Halfacre on Apr. 19, 1994, taught a channel cord cover that was attachable to brackets on room surfaces.

SUMMARY OF THE INVENTION

In light of problems that have existed and that continue to exist in this field, objectives of this invention are to provide a surface raceway which:

Provides a surface raceway to cover a cord in any type or size of room for positioning an electrically operative item wherever desired in the room, regardless of whether, where and how electrical outlets and fixture attachments in the room are positioned;

Provides an aesthetic and protective covering for aftermarket attachment of electrical cords and lines for electrically operative items, such as lights and ceiling fins, and for other lines or cables, such as fiber optic hydraulic lines, etc.;

Can be installed quickly and easily by either lay people or electricians in any room condition without the need to measure or cut;

Is adjustable telescopically in length between desired positions;

Is adjustable in circumferential perimeter; and

Is inexpensive and long-lasting, making it economical to use in a wide variety of use conditions.

This invention accomplishes the above and other objectives with resilient sleeves or tubes, made of PVC or any resilient material, that can be round or polygonal with an end-to-end linear opening having edges that spread circumferentially for telescopic assembly to provide telescopically variable length and resiliently variable perimeter into which electrical power cords, lines and/or chains for electrically operative items, such as lights, fans, security devices and computers or other lines or cables, such as fiber optics or hydraulic lines, can be inserted to provide covering en route between an operative position of the electrically operative items and a separate position of an electrical outlet or other separate position of control. A plurality of the resilient sleeves or tubes are assembled telescopically, attached to room surfaces and joined with appropriate tubular elbows at corners of room surfaces between the operative position and the separate position of the electrical outlet or other separate position. A method is to cover such lines by inserting them through at least one telescopic assembly of resilient tubes having end-to-end linear openings that spread circumferentially and attaching the telescopic assembly to at least one room surface between an operative position and a control position between which lengths of the telescopic assemblies are adjustable telescopically as necessary.

The above and other objects, features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

This invention is described by appended claims in relation to description of a preferred embodiment with reference to the following drawings which are described briefly as follows:

DESCRIPTION OF PREFERRED EMBODIMENT

Reference is made first to FIGS. 1–6. A telescopic assembly 1 has a first resilient tube 2 and a second resilient tube 3. The second resilient tube 3 fits with design snugness inside of the first resilient tube 2 in telescopic relationship for design snugness of telescopic length adjustment of the telescopic assembly 1. An end-to-end opening in the first resilient tube 2 has a first-tube inside opening edge 4 and a first-tube outside opening edge 5 in a design peripheral relationship which in this embodiment is a first-tube circumferential overlap 6. An end-to-end opening in the second resilient tube 3 has a second-tube inside opening edge 7 and a second-tube outside opening edge 8 in a design peripheral relationship of a second-tube circumferential overlap 9.

In this embodiment, the first resilient tube 2 and the second resilient tube 3 are generally the same size. They have the same wall thicknesses and the same diameters. Consequently the first-tube circumferential overlap 6 and the second-tube circumferential overlap 9 are substantially the same until the second resilient tube 3 is compressed by hand-squeezing or other method to a smaller diameter to fit inside of the first resilient tube 2. When compression pressure on the second resilient tube 3 is released inside of the first resilient tube 2, resilient expansion tension of the second resilient tube 3 is pitted against resilient contraction pressure of the first resilient tube 2 to seek an equilibrium of tension. At an equilibrium of tension, the first-tube circumferential overlap 6 decreases from a compressed state and the second-tube circumferential overlap 9 decreases from its normal state to where they are more nearly equal than when joined telescopically but still unequal generally.

Tubing for the first resilient tube 2 and the second resilient tube 3 is preferably PVC or similar plastic material of the same dimensions. Because they are preferably the same diameters and wall thicknesses for this embodiment, they are provisionally or temporarily a provisional first resilient tube 2 and a provisional second resilient tube 3, depending on which is positioned outside as the first resilient tube 2 and which is positioned inside as the second resilient tube 3 respectively.

Variable periphery of this embodiment requires cylindrical form of the first resilient tube 2 and the second resilient tube 3. This is a preferred form. However, resiliency for a telescopic assembly 1 can be achieved with either cylindrical forms or polygonal forms having compensational different peripheral distances with either overlap openings as described in relation to FIGS. 7–12 or with gap openings as described in relation to FIGS. 13–18. All cylindrical and polygonal forms of telescopic assemblies 1 will be designated by the same component number 1 because their function and use are the same but for various cost, convenience and attachment factors.

Figure 1:
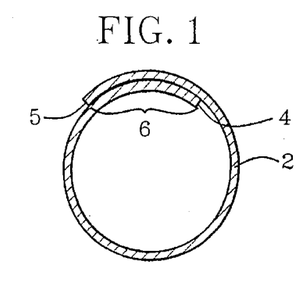
FIG. 1 is an end view of a first resilient tube which is a provisional first resilient tube in this embodiment.
Figure 2:
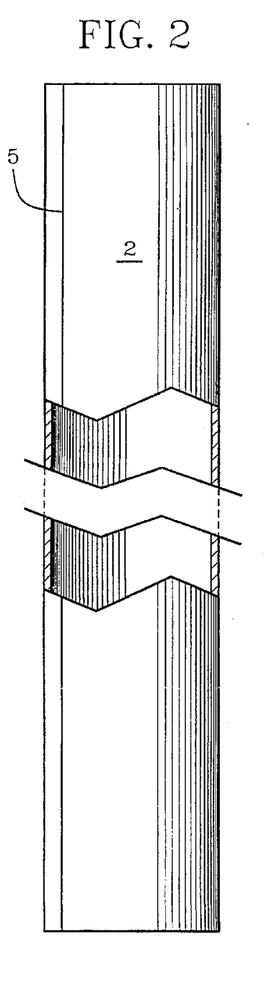
FIG. 2 is a partial cutaway side view of the FIG. 1 illustration.
Figure 3:
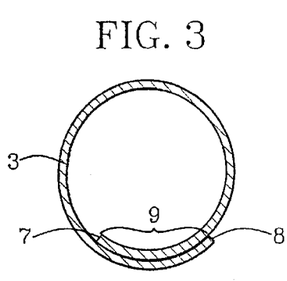
FIG. 3 is an end view of a second resilient tube which is a provisional second resilient tube in this embodiment.
Figure 4:
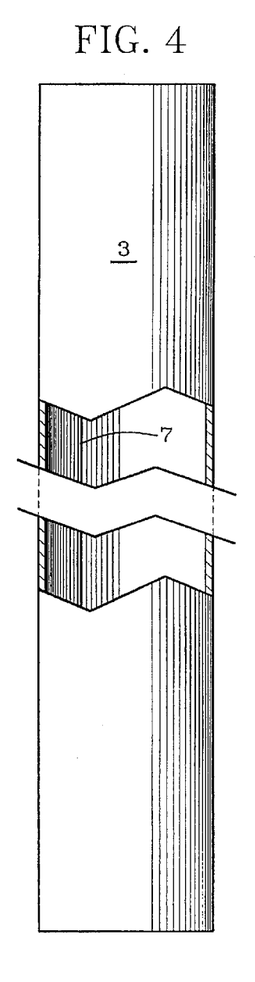
FIG. 4 is a partial cutaway side view of the FIG. 3 illustration.
Figure 5:
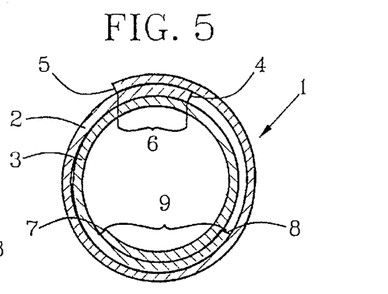
FIG. 5 is an end view of a telescopic assembly of FIGS. 1–4.
Figure 6:
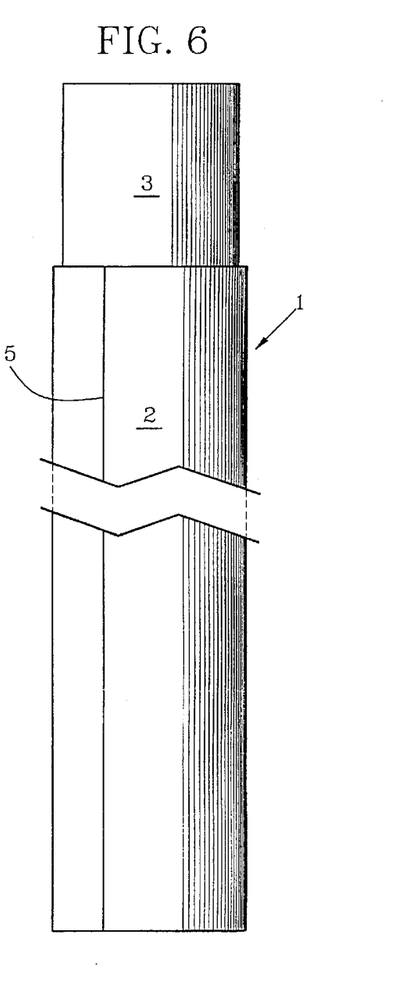
FIG. 6 is a partial cutaway side view of the FIG. 5 illustration.
Figure 7:
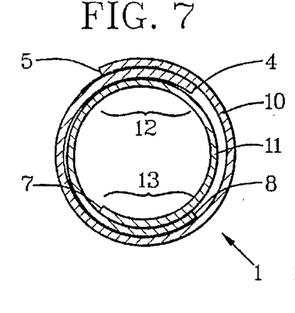
FIG. 7 is an end view of a telescopic assembly in which a first resilient tube has a larger diameter than a second resilient tube having overlap openings and both tubes are cylindrical.
Figure 8:
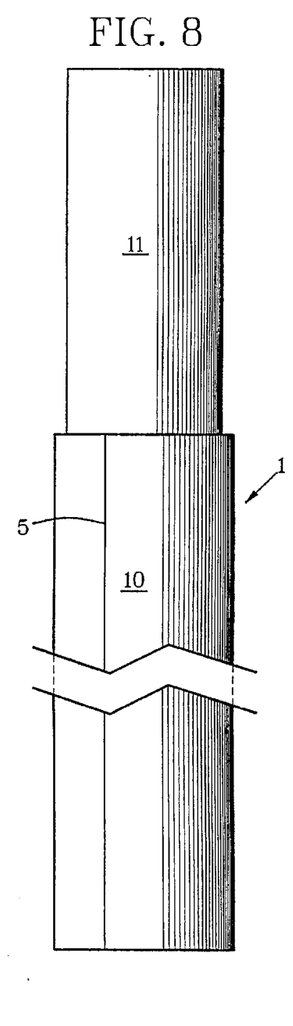
FIG. 8 is a partial cutaway side view of the FIG. 7 illustration.

Reference is made now to FIGS. 7–12. FIGS. 7–8 are telescopic assemblies 1 comprised of an outside cylindrical tube 10 that has a larger periphery than an inside cylindrical tube 11, both cylindrical tubes 10 and 11 being resilient. An outside overlap 12 corresponds to a first-tube circumferential overlap 6 and an inside overlap 13 corresponds to a second-tube circumferential overlap 9 described in relation to FIGS. 1–6. Desired tightness of fit for reliability of telescopic length adjustment can be provided without as much change in the overlaps 12 and 13 as in the overlaps 6 and 9 respectively. However, different diameters of tubes 10 and 11 are required for this embodiment.

Figure 9:
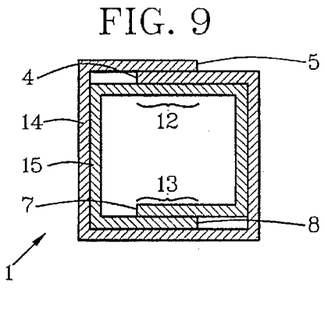
FIG. 9 is an end view of a telescopic assembly in which a first resilient tube has a larger diameter than a second resilient tube having overlap openings and both tubes are rectangularly polygonal.
Figures 10, 12:
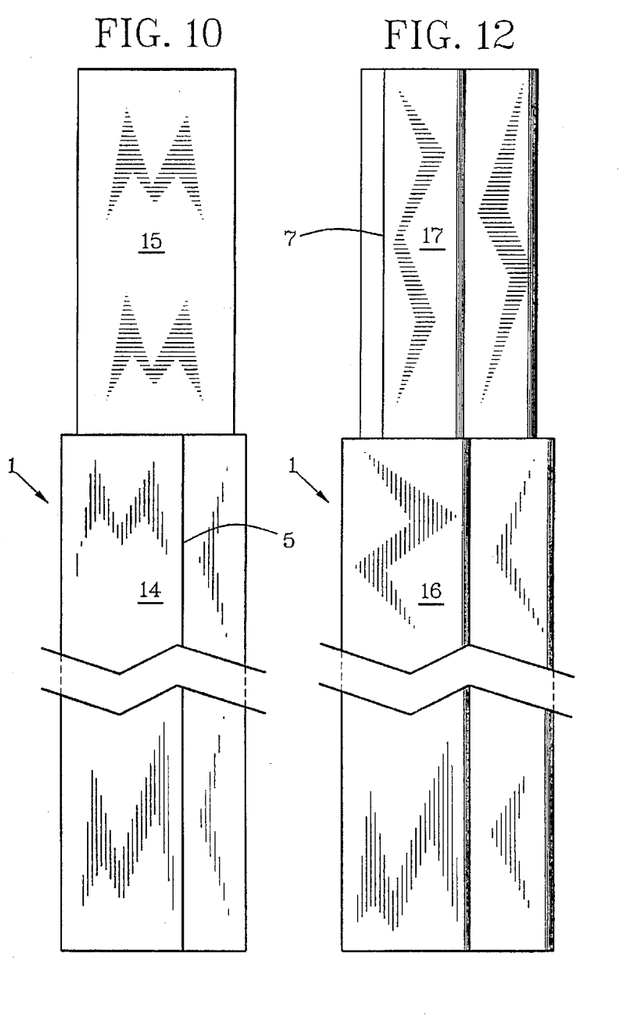
FIG. 10 is a partial cutaway side view of the FIG. 9 illustration.
FIG. 12 is a partial cutaway side view of the FIG. 11 illustration.

FIGS. 9–10 are telescopic assemblies 1 comprised of an outside rectangular tube 14 that has a larger periphery than an inside rectangular tube 15, both rectangular tubes 14 and 15 being resilient. An outside overlap 12 corresponds to a first-tube circumferential overlap 6 and an inside overlap 13 corresponds to a second-tube circumferential overlap 9 described in relation to FIGS. 1–6 and 7–8. Different peripheral sizes of rectangular tubes 14 and 15 are required for effective telescopic effects, the same as described in relation to FIGS. 7–8.

Figure 11:
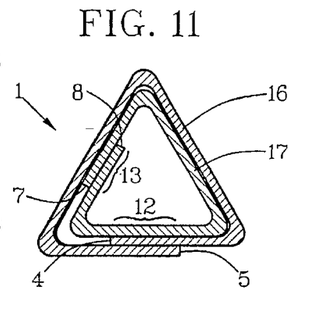
FIG. 11 is an end view of a telescopic assembly in which a first resilient tube has a larger diameter than a second resilient tube having overlap openings and both tubes are triangular.

FIGS. 11–12 are telescopic assemblies 1 comprised of an outside triangular tube 16 that has a larger periphery than an inside triangular tube 17, both triangular tubes 16 and 17 being resilient. An outside overlap 12 corresponds to a first-tube circumferential overlap 6 and an inside overlap 13 corresponds to a second-tube circumferential overlap 9 described in relation to FIGS. 1–10. Different peripheral sizes of triangular tubes 16 and 17 are required for effective telescopic effects, the same as for different sizes of cylindrical tubes 10 and 11 described in relation to FIGS. 7–8 and for different sizes of rectangular tubes 14 and 15 described in relation to FIGS. 9–10.

For all forms of telescopic assemblies 1, the same numbers are used to designate first-tube inside opening edges 4, first-tube outside opening edges 5, second-tube inside opening edges 7 and second-tube outside opening edges 8. This same consistency is used for all forms of resilient tubes and types of openings.

Reference is made now to FIGS. 13-18. Sides of gap openings in FIGS. 13–18 are spreadable between a first outside-opening edge 18 and a second outside-opening edge 19, and between a first inside-opening edge 20 and a second inside-opening edge 21 respectively. Spreading of edge 18 from edge 19 and spreading of edge 20 from edge 21 is functionally similar to spreading of edge 4 from edge 5 and spreading of edge 7 from edge 8 described in relation to FIGS. 1–12.

Figure 13:
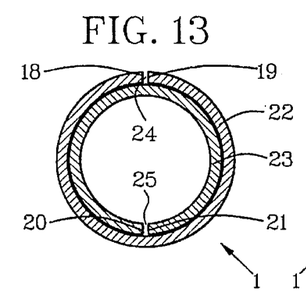
FIG. 13 is an end view of a telescopic assembly in which a first resilient tube has a larger diameter than a second resilient tube having gap openings and both tubes are cylindrical.
Figure 14:
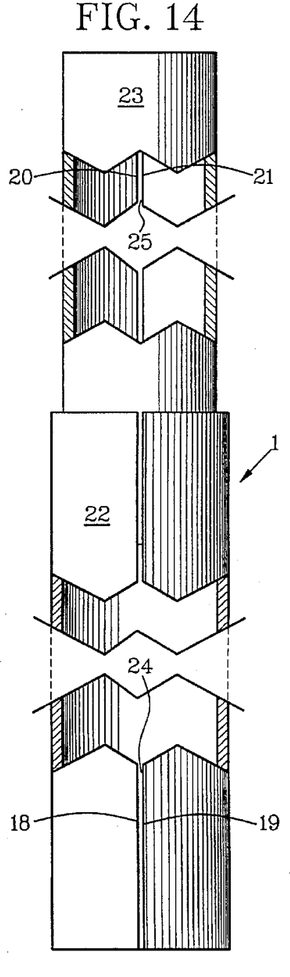
FIG. 14 is a partial cutaway side view of the FIG. 13 illustration.

FIGS. 13–14 are telescopic assemblies 1 comprised of an outside cylindrical tube 22 that has a larger periphery than an inside cylindrical tube 23, both cylindrical tubes 22 and 23 being resilient. An outside gap 24 corresponds to a first-tube circumferential overlap 6 and an inside gap 25 corresponds to a second-tube circumferential overlap 9 described in relation to FIGS. 1–6. Desired tightness of fit for reliability of telescopic length adjustment can be provided without as much change in the gaps 24 and 25 as in the overlaps 6 and 9 respectively. However, different diameters of tubes 22 and 23 are required for this telescopic assembly 1 also.

Figure 15:
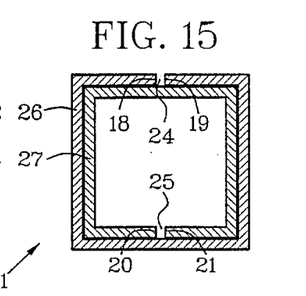
FIG. 15 is an end view of a telescopic assembly in which a first resilient tube has a larger diameter than a second resilient tube having gap openings and both tubes are rectangularly polygonal.
Figure 16:
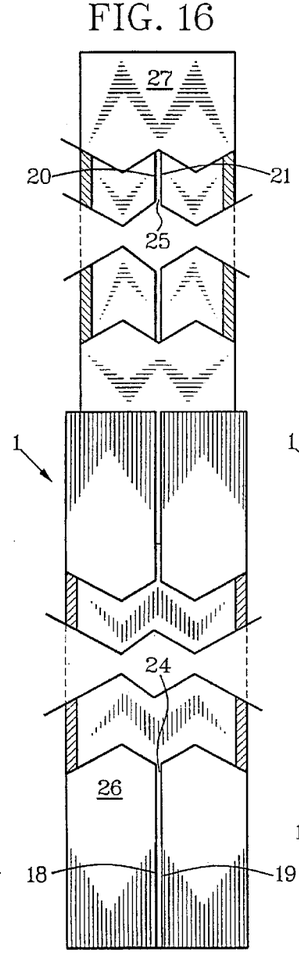
FIG. 16 is a partial cutaway side view of the FIG. 15 illustration.

FIGS. 15–16 are telescopic assemblies 1 comprised of an outside rectangular tube 26 that has a larger periphery than an inside rectangular tube 27, both rectangular tubes 26 and 27 being resilient. An outside gap 24 corresponds to a first-tube circumferential overlap 6 and an inside gap 25 corresponds to a second-tube circumferential overlap 9 described in relation to FIGS. 1–6. Different peripheral sizes of rectangular tubes 26 and 27 are required for effective telescopic effects, the same as for different-sized inside rectangular tube 15 and outside rectangular tube 14 described in relation to FIGS. 9–10.

Figure 17:
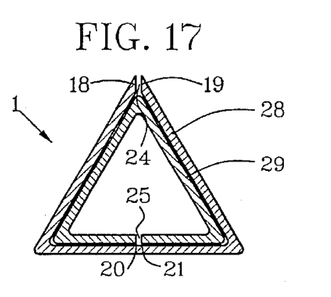
FIG. 17 is an end view of a telescopic assembly in which a first resilient tube has a larger diameter than a second resilient tube having gap openings and both tubes are triangular.
Figure 18:
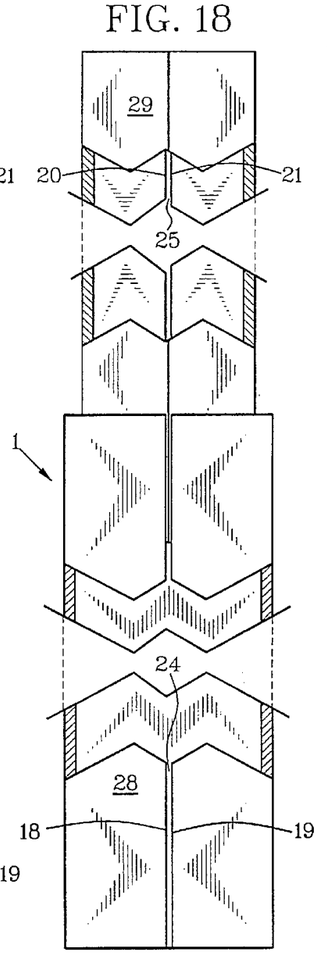
FIG. 18 is a partial cutaway side view of the FIG. 17 illustration.

FIGS. 17–18 are telescopic assemblies 1 comprised of an outside triangular tube 28 that has a larger periphery than an inside triangular tube 29, both triangular tubes 28 and 29 being resilient. An outside gap 24 corresponds to a first-tube circumferential overlap 6 and an inside gap 25 Corresponds to a second-tube circumferential overlap 9 described in relation to FIGS. 1–6. Different peripheral sizes of triangular tubes 28 and 29 are required for effective telescopic effects, the same as for different sizes of cylindrical tubes 10 and 11 described in relation to FIGS. 7–8, for different sizes of rectangular tubes 14 and 15 described in relation to FIGS. 9–10 and for different sizes of triangular tubes 16 and 17 described in relation to FIGS. 11–12.

Figure 19:
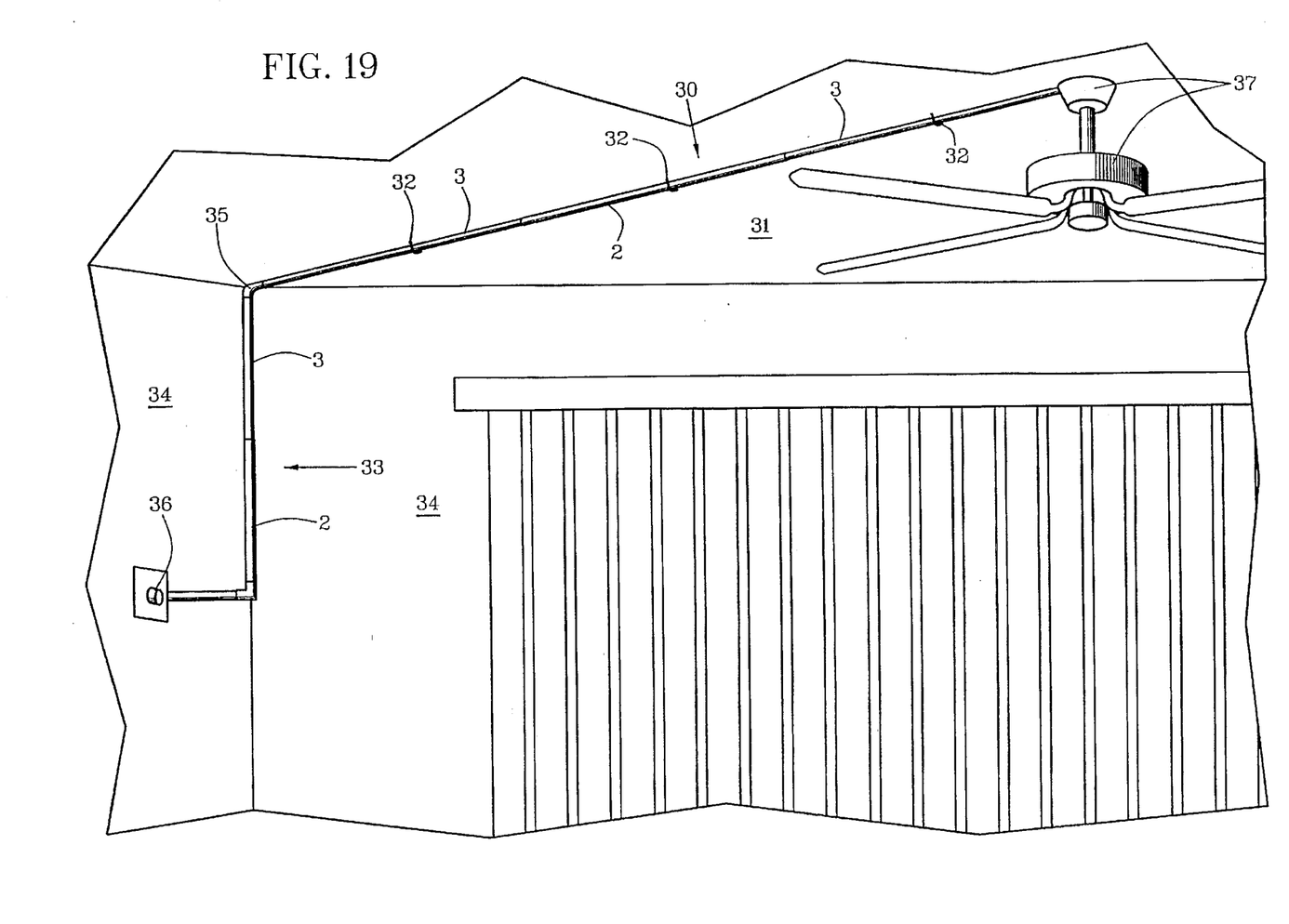
FIG. 19 is a perspective fragmentary view of an installation on walls of a desired structure.

Referring to FIG. 19, at least one first telescopic assembly 30 having at least one first resilient tube 2 and at least one second resilient tube 3 can be attached to a first surface 31 of a desired structure with at least one attachment means such as a wall screw 32. At least one second telescopic assembly 33 can be attached to at least one second surface 34 with a suitable means. A tube elbow 35 can be employed to join the at-least-one first telescopic assembly 30 and the at-least-one second telescopic assembly 33. There can be more than one surface 34 such as in a trihedral corner as shown. The at-least-one second telescopic assembly 33 can be routed to a control switch 36 as illustrated. Cord related to operation of an electrical item such as a fan 37 can be inserted through the at-least-one first telescopic assembly 30, through the tube elbow 35 and through the at-least-one second telescopic assembly 33 en route from the control switch 36 to the fan 37 or other electrical item. The at-least-one first resilient tube 2 is illustrated as being slightly larger in diameter or peripheral size than the at-least-one second resilient tube 3 in both the at-least-one first telescopic assembly 30 and the at-least-one second telescopic assembly 33 to reflect a telescopic structure.

Figures 20, 21:
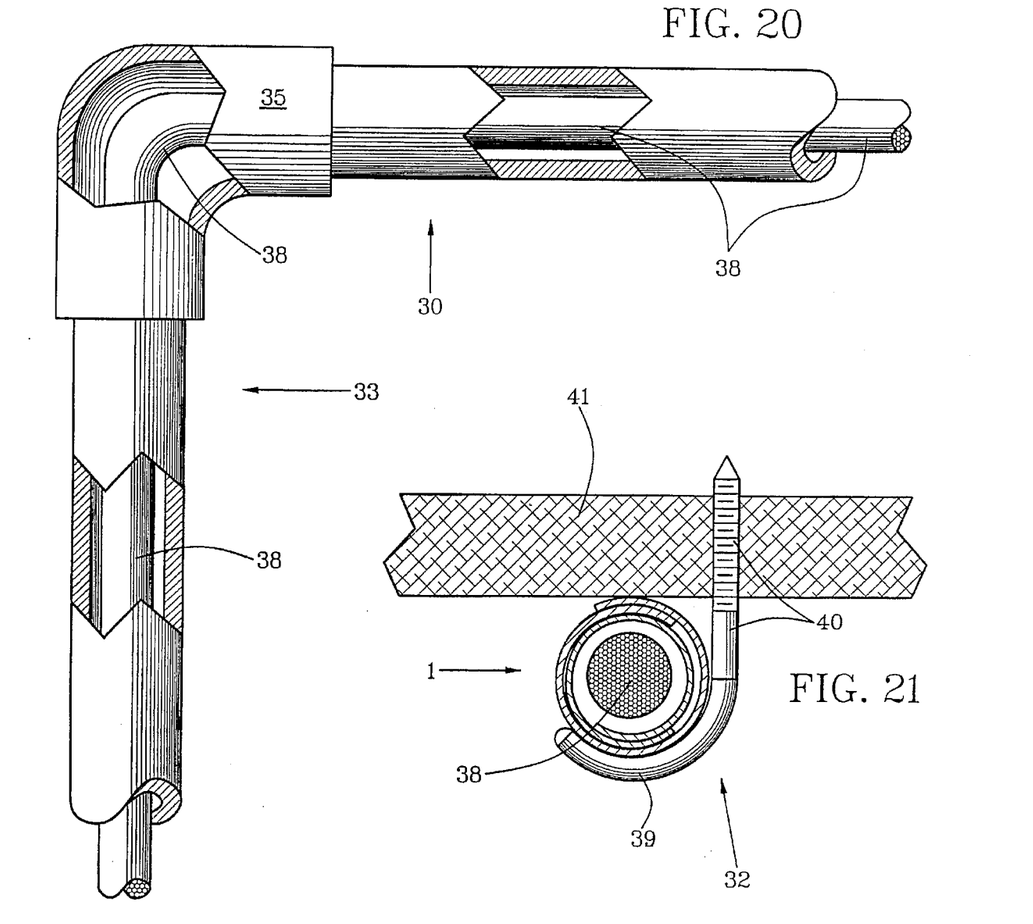
FIG. 20 is a partial cutaway fragmentary view of a plurality of telescopic assemblies joined by an elbow.
FIG. 21 is a partial cutaway fragmentary view of a cylindrical telescopic assembly attached to a wall surface with a form of L screw and having a cord inserted in the telescopic assembly.

Referring to FIG. 20, a tube elbow 35 has resilient tubes of a first telescopic assembly 30 and a second telescopic assembly 33 attached to it in fluid communication for insertion of a cord 38. The cord 38 can be one or more electrical cords and/or mechanical cords, chains or lines.

Figure 22:
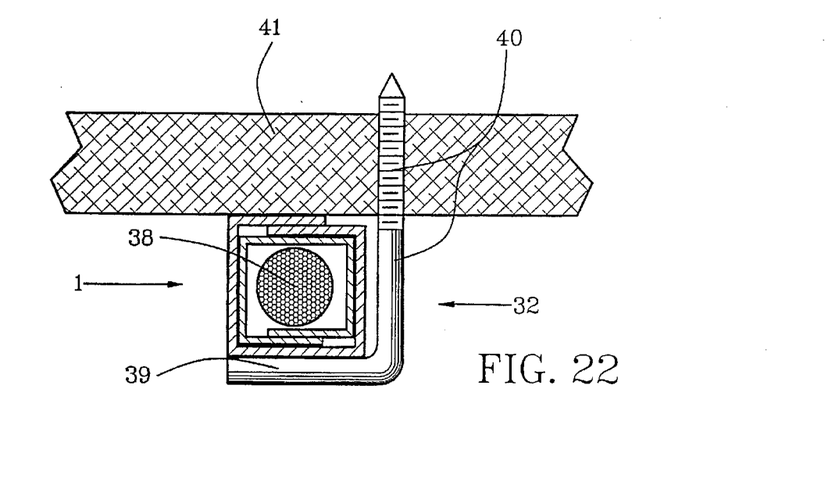
FIG. 22 is a partial cutaway fragmentary view of a rectangular telescopic assembly attached to a wall surface with a form of L screw and having a cord inserted in the telescopic assembly.
Figure 23:
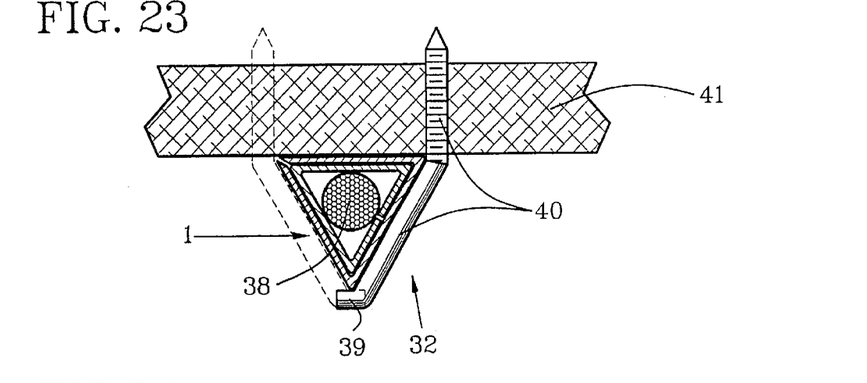
FIG. 23 is a partial cutaway fragmentary view of a triangular telescopic assembly attached to a wall surface with a form of L screw and having a cord inserted in the telescopic assembly.

Referring to FIGS. 21–23, a wall screw 32 having an L-shaped, J-shaped or otherwise shaped arm 39 on a screw shank 40 can be employed for attaching the telescopic assembly 1 to a surface 41 of a desired structure. The arm 39 can be designedly resilient to permit separate positioning of the wall screw 32 and the telescopic assembly 1. The shank 40 can be a type of molly screw also if desired. Wall screws 32 can be positioned on both sides of either type of telescopic assembly 1 as depicted with one wall screw 32 in dashed lines for a triangular telescopic assembly 1 in FIG. 23.

Figure 24:
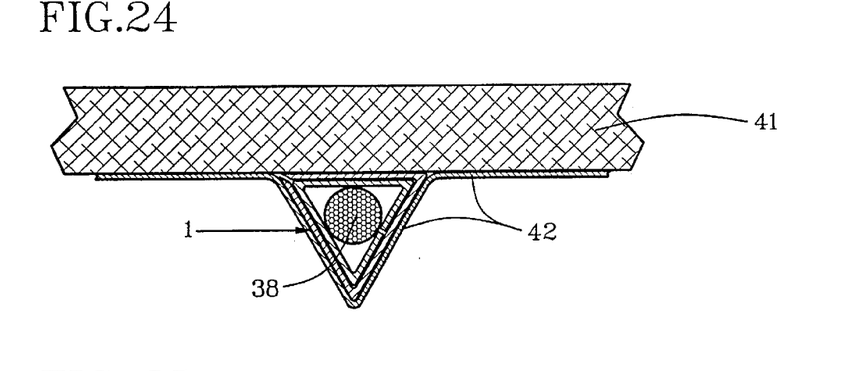
FIG. 24 is a partial cutaway fragmentary view of a triangular telescopic assembly attached to a wall surface with a form of wall covering or tape and having a cord inserted in the telescopic assembly.
Figure 25:
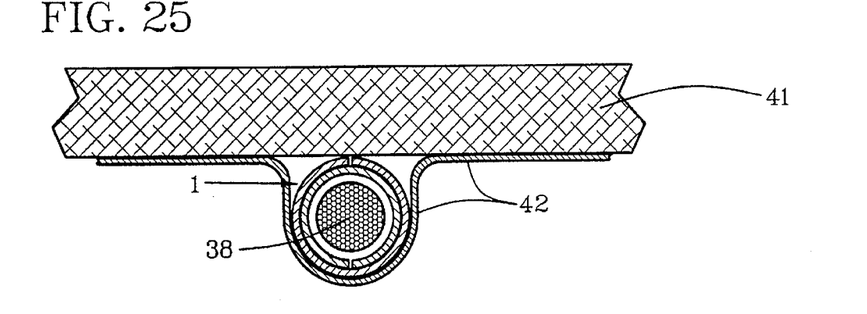
FIG. 25 is a partial cutaway fragmentary view of a cylindrical telescopic assembly attached to a wall surface with a form of wall covering or tape and having a cord inserted in the telescopic assembly.
Figure 26:
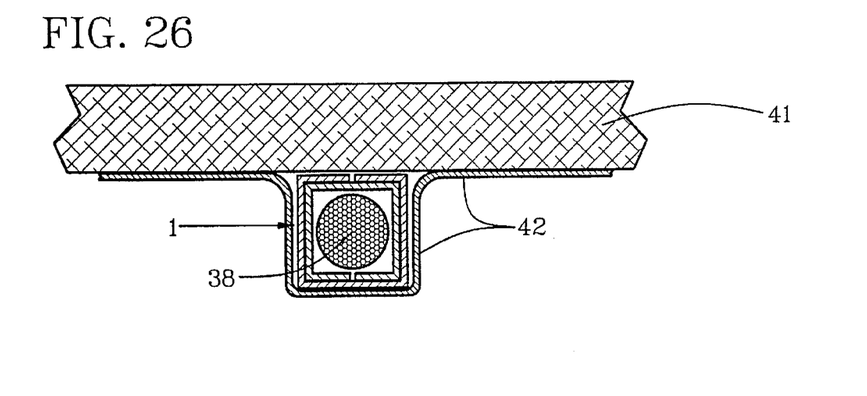
FIG. 26 is a partial cutaway fragmentary view of a rectangular telescopic assembly attached to a wall surface with a form of wall covering or tape and having a cord inserted in the telescopic assembly.

Referring to FIGS. 24–26, a wall covering 42 and/or a flexible tape can be employed as a means for attaching a telescopic assembly 1 of either form to a surface 41 of a desired structure. A wide variety of fastener means are foreseeable for attaching telescopic assemblies 1 to surfaces 41. Several preferred means have been described.

A new and useful SURFACE RACEWAY AND METHOD having been described, all such modifications, adaptations, substitutions of equivalents, combinations of parts, applications and forms thereof as described by the following claims are included in this invention.

I claim:

1. A surface raceway comprising:
   at-least-one telescopic assembly having at-least-one first resilient tube and at-least-one second resilient tube;
   the at-least-one first resilient tube and the at-least-one second resilient tube having end-to-end openings with edges of the end-to-end openings having a predetermined peripheral relationship;
   the end-to-end openings being sized; shaped and positioned for peripheral compensation to provide resiliency for snugness of fit of the at-least-one second resilient tube inside of the at-least-one first resilient tube for telescopic length-adjustment of the at-least-one telescopic assembly;
   an inside periphery of at least the at-least-one second resilient tube being designed to receive lines;
   wherein said predetermined peripheral relationship of the end-to-end openings is peripheral overlap to provide resiliently variable perimeters of the at-least-one first resilient tube and the at-least-one second resilient tube;

the at-least-one first resilient tube being an outside tube provisionally and the at-least-one second resilient tube being an inside tube provisionally; and the peripheral overlap of the outside tube is decreased and the peripheral overlap of the inside tube is increased resiliently as necessary for telescopic assembly provisionally.

2. A surface raceway as described in claim 1 further comprising:

at least one tube elbow provided at a joint of at least two surfaces of the structure; and said at-least-one telescopic assembly is connected to one end of said at-least-one tube elbow; wherein internal peripheries of the at-least-one telescopic assembly and the at-least-one tube elbow are in fluid communication.

3. A surface raceway as described in claim 1 wherein:

the at-least-one first resilient tube and the at-least-one second resilient tube are cylindrical.

4. A surface raceway as described in claim 1 wherein:

the at-least-one first resilient tube and the at-least-one second resilient tube are rectangular.

5. A surface raceway as described in claim 1 wherein:

the at-least-one first resilient tube and the at-least-one second resilient tube are triangular.

6. A surface raceway as described in claim 1 wherein:

peripheries of the at-least-one first resilient tube and the at-least-one second resilient tube are equal.

7. A surface raceway as described in claim 1 wherein:

peripheries of the at-least-one first resilient tube and the at-least-one second resilient tube are different.

8. A surface raceway as described in claim 1 wherein:

the at-least-one first resilient tube and the at-least-one second resilient tube are polygonal.

9. A surface raceway as described in claim 1 and further comprising:

a means for attaching the at-least-one telescopic assembly to a surface of a structure.

10. A surface raceway as described in claim 9 wherein:

the means for attaching the at-least-one telescopic assembly to the surface of the structure is a screw.

11. A surface raceway as described in claim 10 wherein:

the screw has an L-shape with a threaded leg designed to be screwed into the surface of the structure; and the screw has an arm structured to extend over an outside periphery of the at-least-one telescopic assembly with the threaded leg screwed into the surface of the structure immediately adjacent to the at-least-one telescopic assembly.

12. A surface raceway as described in claim 11 wherein:

the arm of the screw is resilient for being bent temporarily to receive the at-least-one telescopic assembly after the threaded leg has been screwed into the surface of the structure and for returning to a position over the outside periphery of the at-least-one telescopic assembly when released.

13. A surface raceway as described in claim 9 wherein:

the means for attaching the at-least-one telescopic assembly to the surface of the structure is a layer of surface covering that is positioned on the at-least-one telescopic assembly and attached to the surface of the structure at opposite sides of the at-least-one telescopic assembly.

14. A surface raceway as described in claim 9 wherein:

the at-least-one first resilient tube and the at-least-one second resilient tube are cylindrical.

15. A surface raceway as described in claim 9 wherein:

the at-least-one first resilient tube and the at-least-one second resilient tube are rectangular.

16. A surface raceway as described in claim 9 wherein:

the at-least-one first resilient tube and the at-least-one second resilient tube are triangular.

17. A surface raceway as described in claim 9 wherein:

the at-least-one first resilient tube and the at-least-one second resilient tube are polygonal.

18. A method comprising the following steps for after-market covering of lines adjacent a first surface of a structure:

providing at-least-one first telescopic assembly having at least one first resilient tube and at-least-one second resilient tube;

the at-least-one first resilient tube and the at-least-one second resilient tube having end-to-end openings with edges of the end-to-end openings having a predetermined peripheral relationship;

the end-to-end openings being sized, shaped and positioned for peripheral compensation to provide resiliency for snugness of fit of the at-least-one second resilient tube inside of the at-least-one first resilient tube for telescopic length-adjustment of the at-least-one telescopic assembly;

an inside periphery of at least the at-least-one second resilient tube being designed to receive lines;

wherein said predetermined peripheral relationship of the end-to-end openings is peripheral overlap to provide resiliently variable perimeters of the at-least-one first resilient tube and the at-least-one second resilient tube;

the at-least-one first resilient tube being an outside tube provisionally and the at-least-one second resilient tube being an inside tube provisionally;

the peripheral overlap of the outside tube is decreased and the peripheral overlap of the inside tube is increased resiliently as necessary for telescopic assembly provisionally;

inserting the lines through the at-least-one first telescopic assembly; and adjusting a length of the at-least-one first telescopic assembly telescopically to fit onto the first surface of the structure.

19. A method as described in claim 18 and further comprising:

attaching the at-least-one first telescopic assembly to the first surface of the structure with an attachment means.

20. The method as described in claim 18 and further comprising:

providing at least one second telescopic assembly having the same structure as the at-least-one first telescopic assembly;

inserting the lines additionally through the at-least-one second telescopic assembly; and adjusting a length of the at-least-one second telescopic assembly telescopically to fit onto a second surface of the structure.

21. The method as described in claim 20 and further comprising:

attaching the at-least-one second telescopic assembly to the second surface of the structure with an attachment means.

22. A method as described in claim 20 and further comprising:

provided at-least-one tubular elbow to which a plurality of at-least-two resilient tubes of the first and second telescopic assemblies are connected at a joint of at least the first and second surfaces of the structure, internal peripheries of the at-least-two resilient tubes and the at-least-one tubular elbow being in fluid communication; and inserting the lines through the at-least-one tubular elbow prior to inserting the lines through the at-least-one second telescopic assembly.

23. The method as described in claim 22 and further comprising:

attaching the at-least-one tubular elbow to the joint of at least the first and second surfaces of the structure.

* * * * *